(12) United States Patent
Blanford et al.

(10) Patent No.: US 6,722,568 B2
(45) Date of Patent: Apr. 20, 2004

(54) METHODS AND APPARATUS FOR DETECTION AND PROCESSING OF SUPPLEMENTAL BAR CODE LABELS

(75) Inventors: Denis Michael Blanford, Duluth, GA (US); Frederick Peter Tyrrell, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/989,632

(22) Filed: Nov. 20, 2001

(65) Prior Publication Data

US 2003/0094494 A1 May 22, 2003

(51) Int. Cl.$^7$ ................................................ G06K 7/10
(52) U.S. Cl. ............................. 235/462.11; 235/462.25; 235/462.07; 235/462.08; 235/462.18; 235/375; 235/385
(58) Field of Search .......................... 235/383, 462.01, 235/462.07, 462.13, 462.15, 494, 456, 472.01, 375, 462.11, 462.08, 462.18, 462.25, 385

(56) References Cited

U.S. PATENT DOCUMENTS

| | | | |
|---|---|---|---|
| 3,745,354 A | 7/1973 | Vargo | |
| 3,798,421 A | 3/1974 | Gilberg et al. | |
| 3,959,624 A | * 5/1976 | Kaslow | 235/487 |
| 4,074,114 A | 2/1978 | Dobras | |
| 4,135,663 A | 1/1979 | Nojiri et al. | |
| 4,182,481 A | 1/1980 | Maussion | |
| 4,744,034 A | 5/1988 | Milstein | |
| 4,776,464 A | 10/1988 | Miller et al. | |
| 4,844,509 A | 7/1989 | Kasprzak et al. | |
| 4,889,367 A | 12/1989 | Miller | |
| 4,910,672 A | 3/1990 | Off et al. | |
| 5,128,520 A | 7/1992 | Rando et al. | |
| 5,198,649 A | 3/1993 | Brooks | |
| 5,287,434 A | 2/1994 | Bain et al. | |
| 5,311,000 A | * 5/1994 | Brooks | 235/462.16 |
| 5,382,779 A | * 1/1995 | Gupta | 235/383 |
| 5,401,944 A | * 3/1995 | Bravman et al. | 235/375 |
| 5,440,110 A | * 8/1995 | Brooks | 235/462.07 |
| RE35,117 E | 12/1995 | Rando et al. | |
| 5,493,107 A | * 2/1996 | Gupta et al. | 235/383 |
| 5,602,382 A | 2/1997 | Ulvr et al. | |
| 5,621,503 A | 4/1997 | Komaki et al. | |
| 5,686,715 A | 11/1997 | Kawai et al. | |
| 5,725,253 A | 3/1998 | Salive et al. | |
| 5,790,932 A | 8/1998 | Komaki et al. | |
| 6,096,272 A | * 8/2000 | Clark et al. | 422/64 |
| 6,158,660 A | * 12/2000 | Blanford et al. | 235/462.11 |
| 6,321,986 B1 | * 11/2001 | Ackley | 235/462.01 |

FOREIGN PATENT DOCUMENTS

| | | |
|---|---|---|
| EP | 0390162 | 10/1990 |
| EP | 1031937 | 8/2000 |

* cited by examiner

*Primary Examiner*—Michael G. Lee
*Assistant Examiner*—Kimberly Nguyen
(74) *Attorney, Agent, or Firm*—Priest & Goldstein, PLLC

(57) ABSTRACT

A system for improved detection and decoding of a supplemental bar code label accompanying a primary bar code label is described. A supplemental label is affixed to a product in the vicinity of a primary label. A scanner in a bar code reading system, such as a point of sale system, scans for a primary label. Upon detection of a primary label, the system looks for the bar code encoded on the label in a database containing a set of bar codes with a value associated with each bar code. The value determines how long a search is to be conducted for a supplemental label accompanying the primary label which was scanned. The duration may suitably be based on the probability that a supplemental label will be present. It may also be influenced by the difficulty of detecting a supplemental label which may be present. The database may be preprogrammed, or may be built as scanning proceeds and experience is gained about which primary labels are accompanied by supplemental labels and the time typically required to detect such labels.

20 Claims, 3 Drawing Sheets

METHODS AND APPARATUS FOR DETECTION AND PROCESSING OF SUPPLEMENTAL BAR CODE LABELS

FIELD OF THE INVENTION

The present invention relates generally to bar code label detection and decoding. More particularly, the invention relates to improved methods and apparatus for detecting the presence of a supplemental bar code label to be read in conjunction with a primary bar code label and representing information supplementing the information represented by the primary bar code label.

BACKGROUND OF THE INVENTION

Bar codes are widely used to provide fast and convenient identification of an item. Affixing a bar code to an item provides a machine-readable label, which may contain direct information about the item, or may serve as an index to a stored catalog or directory of items, which may contain as much information about each item as is desired. The use of bar codes is particularly prevalent in retailing. A specific brand or model of an item can be uniquely identified using a bar-coded identification number, with the identification number being quickly and easily read at the time of a transaction. Because the specific class of item can be identified, it is not necessary to place pricing information on the item. Instead, pricing information can be stored in a central computer, making it easy to change pricing for a particular brand or model without individually marking each item. Moreover, the identifying information contained in a bar code makes it easy to maintain records of inventory and to track and store sales information for an item.

It is often desirable to include supplemental information about particular items in a class of items, which are distinguished in some way from the class as a whole. For example, in the case of perishable foods, it is often desirable to discount an individual item, which is approaching the end of its shelf life without discounting similar items, which are not approaching the end of their shelf lives. One advantageous approach for distinguishing between bar coded products is to attach a supplemental bar code label to selected products. The supplemental label is read in conjunction with a standard, or primary, bar code label by a suitably adapted scanner. After a successful read of the primary label, the scanner seeks a supplemental label such as a special markdown label placed in the vicinity of the product identification label and preferably placed so as to partially obscure the primary label. If a supplemental label is detected, the transaction is conducted in accordance with the additional information contained in the supplemental label. Details of the use and processing of supplemental bar code labels are described in Blanford U.S. Pat. No. 6,158,660, assigned to the assignee of the present invention and incorporated herein by reference in its entirety.

Typically, a standard bar code has no features indicating whether or not a supplemental label is present. Therefore, adding a supplemental label can be accomplished without requiring changes to or removal of an existing primary label. However, because the primary label does not indicate whether or not a supplemental label is present, the scanner must search for and detect the supplemental label without the assistance, which would be available, if the primary label contained such an indication. Once a primary label has been scanned, the possibility exists that a complete scan of the product has been accomplished and no supplemental label exists to be scanned. If a supplemental label exists but is not struck by a scan line, the scanner will fail to detect the supplemental label and will simply process the primary label as if it were not accompanied by a supplemental label. This problem is exacerbated by the fact that some supplemental labels are not designed to be omnidirectionally scanned and are particularly difficult to detect.

It is possible to increase the likelihood of detecting a supplemental label by increasing the time allowed to search for a supplemental label after the primary label is detected. However, simply increasing the search time in all cases decreases efficiency, because time will be wasted in many cases by spending this increased time to search for a supplemental label when none exists. There exists, therefore, a need for a scanner which increases the likelihood of detecting a supplemental label but does not decrease efficiency by extending a search for a supplemental label whether or not a supplemental label is likely to exist.

SUMMARY OF THE INVENTION

According to one aspect, an improved scanner according to the present invention determines when a supplemental label is likely to be present by tracking past experience. If a scan has occurred in which a particular primary label has been detected in conjunction with a supplemental label, the scanner stores this experience and similar experiences, in order to identify a primary label or labels which are likely to be accompanied by supplemental label. Each bar code appearing on a primary bar code label is stored in a database along with a value reflecting the expected probability that the primary label bearing the bar code will be accompanied by a supplemental label. If a primary bar code label is subsequently detected in a scan and a supplemental bar code label is not immediately detected, the scanner searches the database for the bar code and retrieves the value associated with the bar code. Depending on the value associated with the bar code, the scanner may refrain from searching for a supplemental label, may conduct a standard default search for a supplemental label, may conduct a search based on the retrieved value or may conduct an indefinite search for a supplemental label until one is found or until the operator intervenes to force an end to the search. Alternatively, a central database of primary bar code labels may be maintained at a retail location or elsewhere and downloaded to each of a plurality of scanners operating at the retail location. Such a database may be built from ongoing scanning experience of each of the scanners, or alternatively may be constructed from known information about which bar codes will be accompanied by supplemental labels codes and the likelihood for each bar code that it will be accompanied by a supplemental label.

A more complete understanding of the present invention, as well as further features and advantages of the invention, will be apparent from the following Detailed Description and the accompanying drawings.

DETAILED DESCRIPTION

Figure 1:
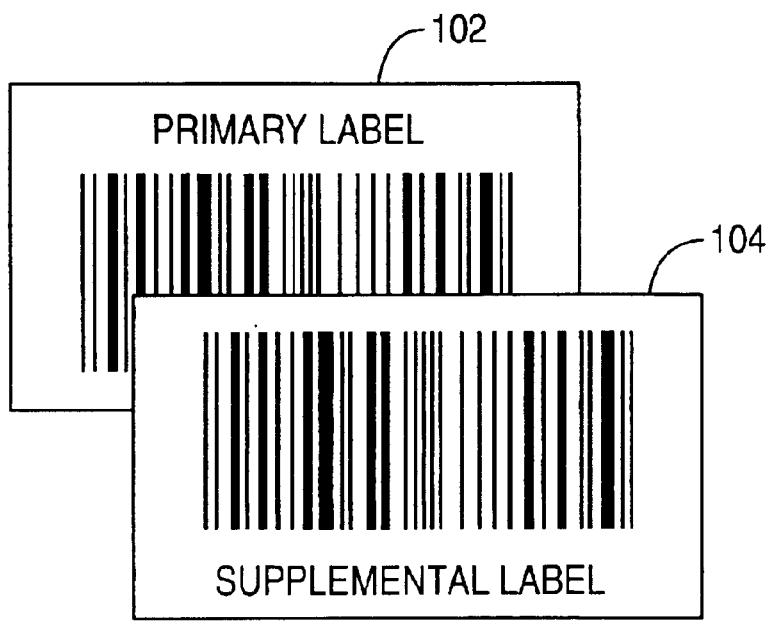
FIG. 1 illustrates a combination primary and supplemental label combination suitable for use with a scanner according to the present invention.

FIG. 1 illustrates an exemplary primary label 102 and supplemental label 104, which may suitably be detected and processed according to the present invention. The primary label 102 is preferably a conventional UPC symbol, which may be used with or without a supplemental label such as the supplemental label 104 being present. The supplemental label 104 may suitably be a Code 128 label as defined in the General EAN specification manual, a two or five character supplemental encodation as defined in the UPC Symbol Specification Manual, Appendix E, or some other type of bar code encoding information supplemental to the main bar code symbol. Because the primary label 102 is suitable for use with or without a supplemental label, the primary label contains no indication of whether or not a supplemental label is present. If the supplemental label is a Code 128 label, the supplemental label 104 may suitably be positioned so as to partially obscure the primary label 102, rendering the primary label 102 more difficult to read. While the supplemental label 104 may be positioned so as to partially obscure the primary label 102, the aspect ratio (label height divided by label length) of the primary label 102 should not be truncated or reduced by more than a factor of two.

Figure 2:
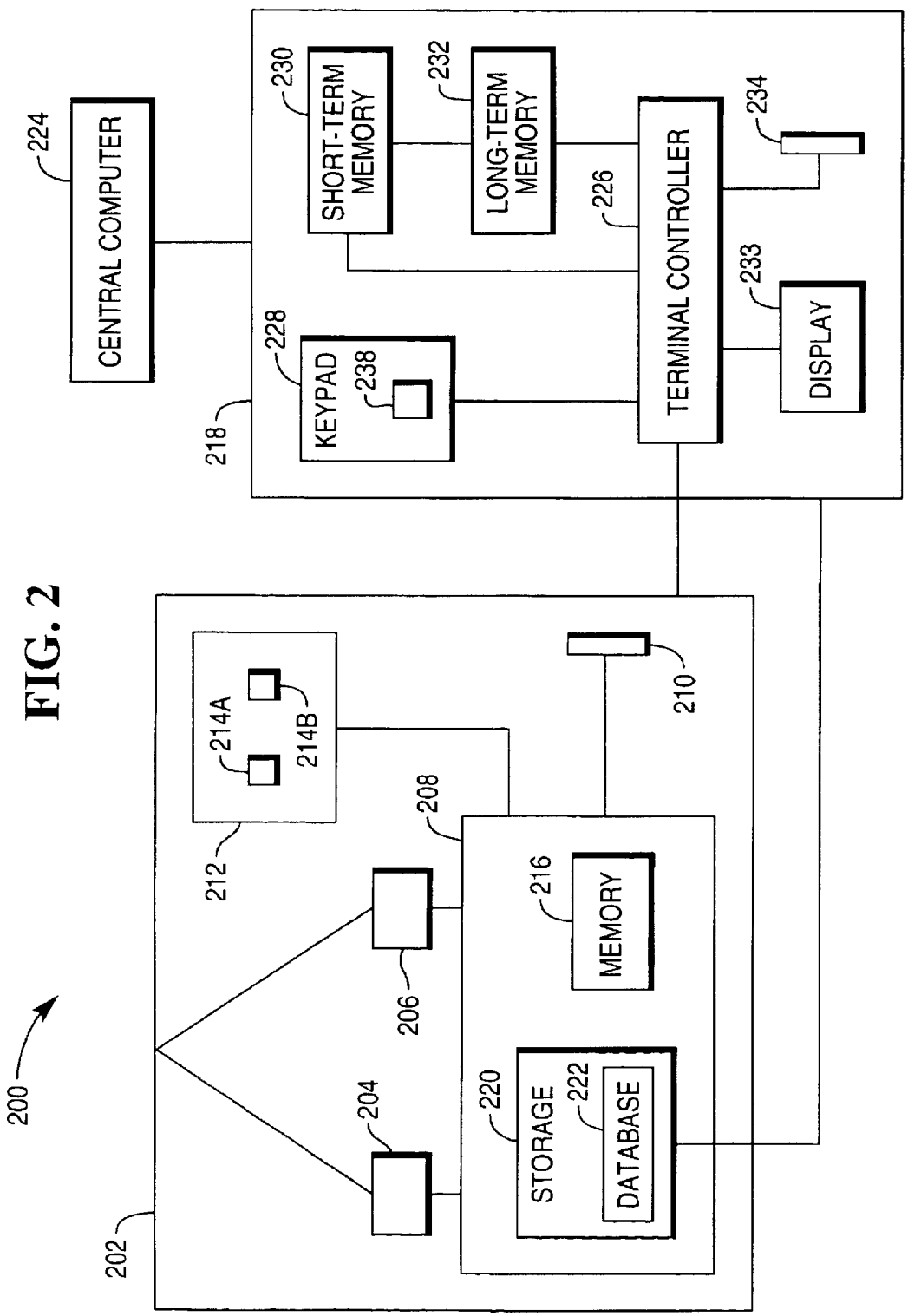
FIG. 2 illustrates a point of sale system using a scanner providing a supplemental label operation according to the present invention.

FIG. 2 illustrates a point of sale system 200 including a scanner 202 according to the present invention. The scanner 202 is adapted to detect and read a primary label such as the primary label 102 of FIG. 1, and to detect and read a supplemental label such as the supplemental label 104 of FIG. 1, if one is present. The scanner 202 includes a laser 204 for illuminating a bar code, a video receiver assembly 206, and a controller 208. The scanner 202 includes a loudspeaker 210 for providing an audible tone to an operator and a visual display, illustrated here as a bicolor indicator 212 having a red light-emitting diode (LED) 214A and a green LED 214B. The controller 208 includes memory 216 for storing bar code information while waiting to transmit the information to a point of sale terminal 218, which is connected to the scanner 202. The memory 216 is also used to store programming information for use by the controller 208 in directing the operation of the scanner 202. The scanner 202 also includes long-term storage 220 for storing a primary label database 222.

The primary label database 222 preferably contains bar code information for each primary bar code label for which information about the likelihood of appearance or difficulty in detecting an accompanying supplemental bar code label is desirable. Stored in association with the information for each primary bar code label is a value indicating the probability that the primary bar code label will appear in conjunction with the supplemental label. If a bar code label will not appear in conjunction with a supplemental label, the bar code information for that label may suitably be absent from the database 222. Alternatively, the bar code may be absent from the database 222 if the probability that a primary label bearing the bar code will be accompanied by a supplemental label does not differ from a default value indicating that a standard search should be conducted.

The database 222 may suitably be constructed and updated on an ongoing basis from detection experience of the bar code scanner 202, may be programmed into the scanner 202 or may alternatively be downloaded from a central computer 224 connected to the bar code scanner 202 and preferably to a plurality of other similar bar code scanners operating in the same retail location. If the database 222 is downloaded from the central computer 224, the database 222 may be programmed into the central computer 224, or alternatively the central computer 224 may suitably construct and update the database 222 from detection experiences of one or more bar code scanners connected to the central computer 224. If the database 222 is programmed into the scanner 222 or the central computer 224, the database 222 may, if desired, be updated according to the detection experience of the scanner 202 or the scanners connected to the central computer 224.

For each primary bar code included in the database 222, additional information may be included, for example the frequency of occurrence of a supplemental label, the date and time of scan or other similar information. This information may advantageously be used to compute the probability that a particular primary label will be accompanied by a supplemental label. These computations may be used to update the database 222. For example, perishable meat products may have a shelf life of 3 days. At 4:00 PM on the third day after being offered for sale, meat products may have a supplemental label added which indicates a 50% price reduction. If this reduction leads to a sharp increase in purchases of these products, the frequency of appearance of a supplemental label accompanying a primary label appearing on these products will increase, as the products are purchased and scanned. This increase in frequency of appearance can be used to compute an increased probability that the primary labels on the products will be accompanied by supplemental labels. As the products are sold, the frequency of appearance of supplemental labels will decline and the probability of appearance of supplemental labels stored in the database can be adjusted downward.

Moreover, capture and storage of the data and time of scans can be used to correlate increase in frequency of supplemental labels with time of day. For example, if sales of the discounted products begin at a high rate at 4:00 PM and decline linearly until 7:00 PM at which point nearly all the discounted products are gone, the database 222 may be adjusted to set a higher probability that a primary label of the discounted class of products will be accompanied by a supplemental label, with the probability being established at a high level at 4:00 PM and declining until 7:00 PM.

The terminal 218 includes a terminal controller 226 for directing the operation of the terminal 218 and controlling communications with the scanner 202. The terminal 218 also includes a keypad 228, connected to the terminal controller 226, for use by an operator in directing the operation of the terminal 218. The terminal 218 also includes short term memory 230 for storing bar code information received from the scanner 202 and for use in operation of the terminal 218 and communication between the terminal 218 and the scanner 202. The terminal 218 includes long-term storage 232 for storing transaction results and other information which may be desired to be retained by the terminal for relatively extended periods. The terminal 218 also includes a display 233 for displaying visual information to the operator and a terminal loudspeaker 234 for providing audible feedback to the operator. The terminal 218 communicates with the central computer 224, which stores pricing information and other information used by the terminal 218 in sales transactions, and which receives transaction results from the terminal 218. The central computer 224 may store a central primary label database 236, which may be downloaded by the terminal 218 and provided to the scanner 202 for use as the primary label database 222. The terminal 218 may communicate continuously with the computer 224, or alternatively may operate in a stand-alone fashion most of the time, periodically exchanging information with the central computer 224.

When a primary label is detected during scanning, the scanner 202 processes the label information to determine the bar code represented by the label and searches the database 222 for the bar code, in order to retrieve information about the likelihood that the primary label will be accompanied by a secondary label. If the bar code is not present in the database 222, the scanner 202 takes appropriate action. For example, if the only bar codes not present in the database 222 are those which are never accompanied by a supplemental label, the scanner 202 will preferably immediately abandon a search for a secondary label. If the database 222 includes only bar codes which have an unusual likelihood of being accompanied by a supplemental label, for example a higher than average likelihood or a certainty of being so accompanied, failure to find a bar code in the database 222 will preferably cause the scanner 202 to search for the bar code for a default time, and then transfer the bar code information to the terminal 218 if no supplemental label is found within the default time, or, if a supplemental label is found within the default time, process the supplemental label and transfer the primary and supplemental bar code information to the terminal 218.

If the bar code is found in the database 222, the associated probability of finding a supplemental label is retrieved and used to define search parameters. The time to be spent searching for a supplemental label is preferably increased as the probability that a particular bar code will be accompanied by a supplemental label increases. If a bar code has a very high likelihood of being accompanied by a supplemental label, the scanner 202 may suitably be directed to continue searching until the supplemental label is found or until the operator intervenes to force an end to the search.

It is also possible to take into account the difficulty of detecting a supplemental label in determining how to conduct a search. For example, the values associated with bar codes in the database 222 may be chosen not to represent the simple probability that a supplemental label will be associate with the bar code. Instead, each value may represent a combination of the probability that a supplemental label will be detected, combined with the difficulty of detecting the label. For example, two different bar codes appearing on primary labels may each have the same probability of being associated with a supplemental label. The supplemental label expected to be associated with the first bar code may be easy to detect and the supplemental label expected to be associated with the second bar code may be difficult to detect. In this case, the first bar code would suitably have a lower associated value in the database 222, while the second bar code would have a higher associated value in the database 222. The higher value associated with the second bar code would cause the scanner 202 to make a longer search for a supplemental label upon detecting the second bar code, taking into account the greater difficulty of detecting the supplemental label.

The scanner 202 can preferably be set to operate in either a conventional mode or a supplemental mode, for example by setting a mode selection switch. If the scanner 202 is set to the conventional mode, bar code information is simply sent to the terminal 218 as each bar code is scanned. In the supplemental mode, the scanner 202 first looks for a primary label, which is typically a UPC, label. The controller 208 examines the data from the video receiver assembly 206 to determine the presence of a primary label such as a UPC label. When a primary label is detected, the controller 208 buffers the data represented by the primary label and searches the database 222 for the bar code represented by the primary label. If the bar code is not found in the database, the controller 208 follows the procedure to be followed in such a case, for example determining not to search for a supplemental label if bar codes not found in the database 222 are never accompanied by supplemental labels or, alternatively, setting a default duration for a search for a supplemental label if bar codes not represented in the database 222 have a standard probability of being accompanied by a supplemental label. If the bar code represented by the primary label is found in the database 222, the controller 208 buffers the data represented by the primary label and takes action as indicated by the value associated with the bar code.

In some cases, the associated value may indicate that no search is to be made and in such cases no delay will be initiated. If the value associated with the bar code does indicate that a search will be made, the controller 202 initiates a delay in accordance with the value associated with the bar code and examines the scan data for the presence of a supplemental label. Upon detection of a supplemental label, the scanner 202 sends the data from both labels to the terminal 218. If no supplemental label is detected by the expiration of the delay period, the scanner 202 sends the data from the UPC label to the terminal 218. The terminal 218 looks up the primary label information to identify the item it represents, and fetches the price of the item. If a supplemental label has been detected, the terminal 218 then looks up the information represented by the supplemental label and uses the information in a predetermined way, for example, using the supplemental label information to determine a markdown amount.

The point of sale system 200 provides auditory and visual feedback to the operator to indicate when a good read occurs. This feedback differs according to whether the scanner 202 or the terminal 218 is to be the source of a good read tone. The choice affects throughput through the point of sale system 200. If the scanner 202 is chosen as the source of the good read tone, a scanner loudspeaker 210 gives an auditory signal as soon as a primary label is detected. This signals the operator to bring another item into the visual field of the scanner 202. As noted above, however, if a search is to be made for a supplemental label, the scanner 202 initiates a delay period upon detection of the primary label. The next item is not read by the scanner 202 until either the delay period expires or a supplemental label is detected. When a supplemental label is detected, the primary and supplemental data are sent to the terminal 218 and the scanner loudspeaker 210 may optionally sound a supplemental label tone, preferably different in frequency from the good read tone. The scanner 202 is then able to process the next item, which was brought into the visual field of the scanner 202 when the operator was alerted by the good read tone produced after the reading of the primary label.

If the terminal 218 is the source of a good read tone, the terminal 218 does not sound the good read tone until after receiving the bar code data. For items with no supplemental label, this occurs after the end of the delay period. At the reception of the bar code data, the terminal loudspeaker 234 sounds a good read tone for the label that was read. This includes a good read tone for the primary label and, optionally, if a supplemental label is present, a supplemental label tone for the supplemental label.

In some cases, primary labels may be unaccompanied by supplemental labels, but the value in the database 222 will not indicate that no search is to be made. For example, the bar code represented by the primary label may be absent from the database 222, causing a default delay to be imposed, and in many cases some primary labels of a particular type may be accompanied by supplemental labels while others are not. Whenever a search is made for a supplemental label when none is present, throughput is degraded. In order to minimize degradation of throughput, the point of sale system 200 preferably provides for an operator-initiated supplemental label function. The keypad 228 may suitably include a special supplemental label key 238, which the operator may press to place the point of sale system 200 into supplemental label mode for the next read only. The point of sale system 200 is operated in the normal mode, but when the operator sees a supplemental label, the operator presses the supplemental label key 238 on the keypad 228, placing the system 200 in supplemental label mode for the next read only. In such a case, the database 222 will not be searched for the bar code represented by the primary label. Instead, because the operator's pressing of the supplemental label key 238 indicates that a supplemental label must be present, a search for a supplemental label will be conducted until a supplemental label is detected, until the operator intervenes or until a predetermined time out is reached.

Figure 3:
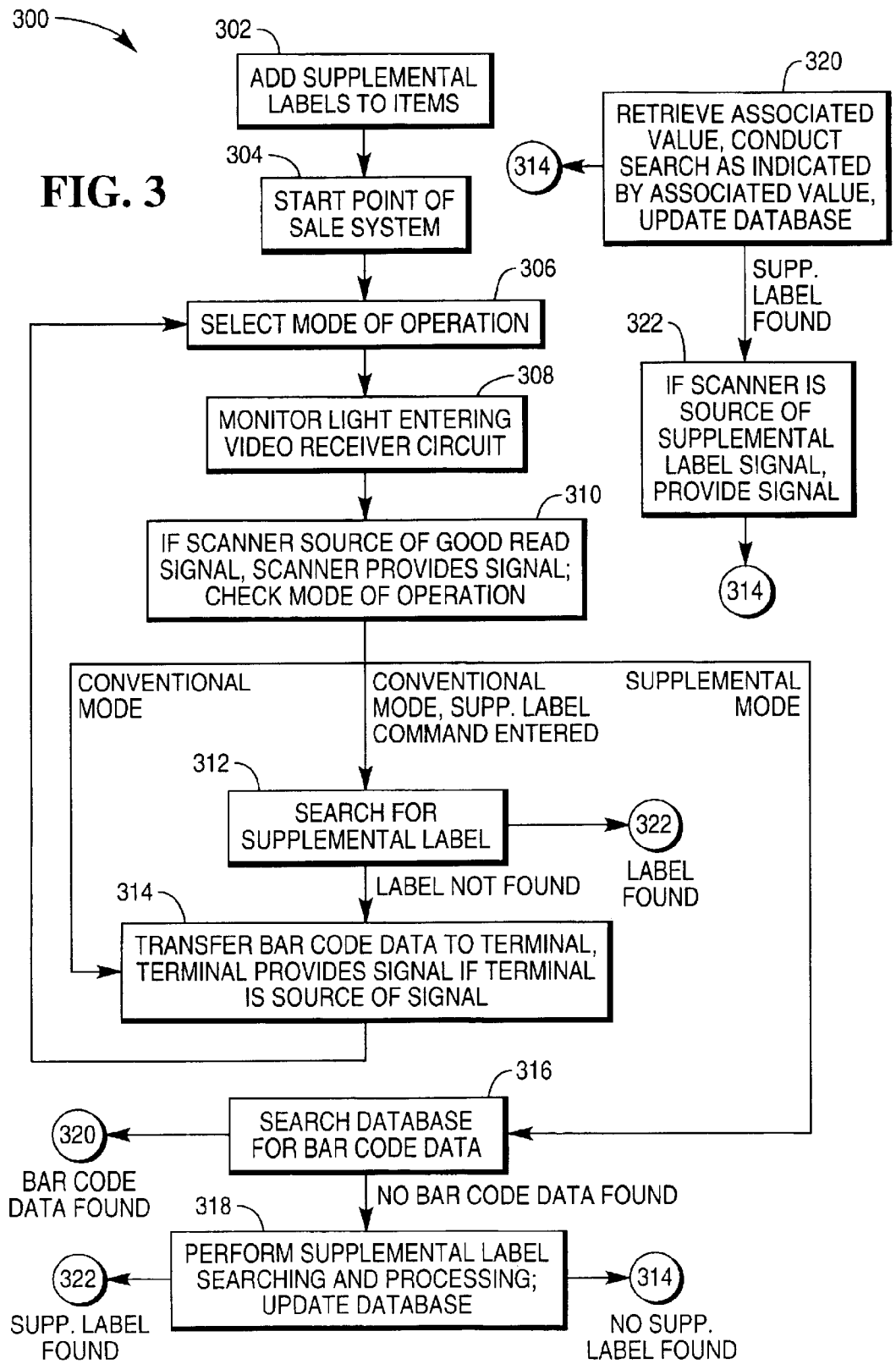
FIG. 3 illustrates the steps of a method for providing and detecting a supplemental label according to the present invention.

FIG. 3 illustrates a process 300 of supplemental label bar coding and bar code reading according to the present invention. At step 302, a supplemental label such as the supplemental label of FIG. 1 is placed on each of a plurality of items meeting predetermined criteria, such as items, which are nearing the end of their shelf life. Each of the items on which a supplemental label is placed already bears a primary label, and each supplemental label is preferably placed near a corresponding primary label as shown in FIG. 1. At step 304, a point of sale system such as the system 200 of FIG. 2, having a supplemental label feature, is started. The point of sale system preferably comprises a scanner and a terminal. At step 306, the mode of operation of the system is selected, either by making an active change or by leaving the system in a previously selected mode of operation. The point of sale system may be operated in a conventional mode or a supplemental label mode. If the system is operated in a conventional mode, an operator-entered supplemental label command may be issued before a specific scan, placing the system into the supplemental label mode for the next scan. At step 308, light entering a video receiver circuit is monitored to determine if a primary label has been detected. If a primary label has been detected, the process proceeds to step 310. If no label has been detected, the process returns to step 306.

At step 310, if the scanner is to be the source of a good read indication, such an indication is provided, preferably through an audible signal. Next, the mode of operation of the point of sale system is examined. If the system is in the conventional mode and no supplemental label command has been entered, the process proceeds to step 314. If the system is in the conventional mode and a supplemental label command has been entered, the process proceeds to step 312 and a search is made for a supplemental label. The search continues until a supplemental label is found, the operator forces an end to the search or a predetermined time out is reached. If the scanner has been chosen to be the source of a good read signal, a preferably audible supplemental label signal is produced if a supplemental label has been found. The process then proceeds to step 314. If the system is in the supplemental label mode, the process proceeds to step 316.

At step 314, the bar code data is transferred to a terminal, which is part of the point of sale system. If the terminal has been chosen to be the source of a good read signal, the terminal provides operator feedback at this point, preferably through an audible signal. The bar code information is processed and control is returned to step 306, to allow the operator to select the mode of operation before the next scan. Mode selection typically does not involve active intervention by the operator, who may select the mode by entering a markdown command, deliberately setting the mode to the conventional or supplemental label mode, or may simply allow the system to remain in the same mode.

At step 316, the scanner searches for the bar code data in a database such as the database 222. If no bar code data is found, the process proceeds to step 318. At step 318, the scanner performs supplemental label searching and processing as predetermined for cases in which the bar code appearing on the primary label does not exist in the database. The scanner may be programmed not to search for a supplemental label or alternatively may be programmed to search for a predetermined default time. If the database is to be progressively built based on scanner experience, the database is updated using the results of the search, with the value associated with the bar code being adjusted to take the search time and search results into account. If a supplemental label is found, the process proceeds to step 322. If no supplemental label is found, the process returns to step 314.

Returning now to step 316, if the bar code is found in the database, the process proceeds to step 320, the value associated with the bar code is retrieved and a search is conducted for a supplemental label as determined by the retrieved value. For example, if the retrieved value indicates a low probability that a supplemental label is present, no search or a short duration search or a short duration search may be conducted, while a longer search may be conducted if the retrieved value indicates a higher probability that a supplemental label is present or that a supplemental label is present which is difficult to detect. If the database is to be progressively built based on scanner experience, the database is updated using the results of the search, with the value associated with the bar code being adjusted to take the search time and search results into account. If a supplemental label is found, the process proceeds to step 322. If the search ends and no supplemental label is found, the process proceeds to step 314.

At step 322, if the scanner is to be the source of the supplemental label indicator, a supplemental label signal may be produced, preferably in a tone of a different frequency than the good read tone. Next, the UPC information and the supplemental label information are transferred to the terminal and the process proceeds to step 314.

While the present invention is disclosed in the context of a presently preferred embodiment, it will be recognized that a wide variety of implementations may be employed by persons of ordinary skill in the art consistent with the above discussion and the claims which follow below.

We claim:

1. A scanner for detecting and decoding primary and supplemental bar code labels, comprising:

a laser for generating light;

a video receiver assembly for detecting light patterns produced by a reflection of the light generated by the laser from one or more bar code labels passing within a field of view ofthe video receiver assembly and producing data based on the light patterns; and a controller for analyzing the data produced by the video receiver assembly to detect a primary bar code label, the controller being operative upon detection of the primary bar code label to search a database for the bar code represented by the primary bar code label and retrieve a value associated with the bar code, the controller being operative to conduct a search for a supplemental bar code label based on the retrieved value associated with the retrieved bar code wherein the retrieved value determines the time to be spent searching for the supplemental bar code label.

2. The scanner of claim 1 wherein the controller does not conduct a search for a supplemental label if the bar code represented by the primary bar code label is not found in the database.

3. The scanner of claim 1 wherein the controller conducts a default search if the bar code represented by the primary bar code label is not found in the database.

4. The scanner of claim 1 where the controller is operative to place the scanner in a supplemental label mode for a following scan only, and upon detecting a primary label the controller is operative to search for a supplemental label until a supplemental label is detected or an operator intervenes to abort the search.

5. The scanner of claim 4 wherein the database includes a plurality of bar codes which may be represented by primary bar code labels and wherein the value associated with each of the bar codes reflects a probability that a primary label bearing the bar code will be accompanied by a supplemental label.

6. The scanner of claim 5 wherein the value associated with each of the bar codes represents a degree of difficulty in detecting a supplemental label likely to accompany a primary label bearing the bar code.

7. The scanner of claim 6 wherein processing the UPC label data includes transferring the primary label data to a terminal connected to the scanner, and processing the supplemental label data includes transferring the supplemental label data to the terminal.

8. The scanner of claim 7 wherein the scanner is further operative to provide operator feedback upon detection of a primary label and to provide further operator feedback upon detection of a supplemental label.

9. The scanner of claim 8 wherein the controller is operative to update the database after a search for a supplemental label in order to refine the values associated with the bar codes to reflect the information provided by the results of the search.

10. The scanner of claim 9 wherein the database is received from a central computer serving a plurality of scanners and wherein each of the scanners provides information to update the database in the central computer.

11. The scanner of claim 1 wherein the retrieved value indicates an expected probability that the primary bar code label is accompanied by the supplemental bar code label.

12. The scanner of claim 11 wherein the time spent searching for the supplemental bar code label increases as the expected probability that the primary bar code label is accompanied by the supplemental bar code increases.

13. The scanner of claim 1 wherein the scanner searches for the supplemental bar code label until the supplemental bar code label is found or until an operator intervenes.

14. The scanner of claim 1 wherein the retrieved value indicates a frequency of occurrence of the supplemental bar code label.

15. The scanner of claim 1 wherein the retrieved value indicates both an expected probability that the primary bar code label is accompanied by the supplemental bar code label and an expected difficulty in detecting the supplemental bar code label.

16. A method of bar code detection and decoding, comprising the steps of:

monitoring light entering a video receiver circuit to determine if a primary label has been detected;

upon detecting a primary label, examining a database for bar code information appearing on the primary label;

retrieving a value associated with the bar code information; and conducting a search for a supplemental label in accordance with the value associated with the bar code information, the retrieved value determining the time to be spent searching for the supplemental bar code label.

17. The method of claim 16 wherein the value associated with the bar code information reflects a probability that the primary label will be accompanied by a supplemental label.

18. The method of claim 17 wherein the value associated with the bar code information reflects a difficulty of detecting a supplemental label likely to accompany the primary label.

19. The method of claim 18, further comprising the step of updating the database based on the results of the search.

20. A scanner for detecting and decoding primary and supplemental bar code labels affixed to an item offered for sale, comprising:

a laser for generating light;

a video receiver assembly for detecting light patterns produced by a reflection of the light generated by the laser from one or more bar code labels passing within a field of view of the video receiver assembly and producing data based on the light patterns; and a controller for analyzing the data produced by the video receiver assembly to detect a primary bar code label affixed to an item offered for sale, the controller being operative upon detection of the primary bar code label to search a database for the bar code represented by the primary bar code label and retrieve a value associated with the bar code, the controller being operative to conduct a search for a supplemental bar code label affixed to the item offered for sale based on the retrieved value associated with the retrieved bar code, wherein the retrieved value determines the time to be spent searching for the supplemental bar code label.

* * * * *